United States Patent
Wu et al.

(10) Patent No.: US 9,064,102 B2
(45) Date of Patent: Jun. 23, 2015

(54) METHOD, SYSTEM AND DEVICE FOR SECURED ACCESS TO PROTECTED DIGITAL MATERIAL

(75) Inventors: Jing Wu, Norcross, GA (US); James Ronald Flesch, Tucker, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 1344 days.

(21) Appl. No.: 11/853,555

(22) Filed: Sep. 11, 2007

(65) Prior Publication Data
US 2009/0070884 A1    Mar. 12, 2009

(51) Int. Cl.
*G06F 21/34* (2013.01)
*H04L 9/32* (2006.01)
*H04W 12/04* (2009.01)
*H04L 29/06* (2006.01)

(52) U.S. Cl.
CPC .............. *G06F 21/34* (2013.01); *H04L 9/3226* (2013.01); *H04W 12/04* (2013.01); *H04L 2209/60* (2013.01); *H04L 2209/80* (2013.01); *H04L 65/4084* (2013.01)

(58) Field of Classification Search
None
See application file for complete search history.

(56) References Cited

U.S. PATENT DOCUMENTS

| | | | |
|---|---|---|---|
| 6,272,533 B1 | 8/2001 | Browne | |
| 6,351,467 B1 | 2/2002 | Dillon | |
| 7,073,200 B2 | 7/2006 | Maliszewski | |
| 8,613,091 B1* | 12/2013 | Vaidya et al. | 726/24 |
| 2005/0108769 A1 | 5/2005 | Arnold et al. | |
| 2005/0262529 A1 | 11/2005 | Neogi et al. | |
| 2005/0278544 A1* | 12/2005 | Baxter | 713/182 |
| 2006/0149967 A1* | 7/2006 | Lee et al. | 713/168 |
| 2007/0086372 A1* | 4/2007 | Lee et al. | 370/328 |
| 2008/0115217 A1* | 5/2008 | Barron et al. | 726/24 |

OTHER PUBLICATIONS

Patent Cooperation Treaty, "PCT Search Report and Written Opinion of the International Searching Authority" for International Application No. PCT/US08/75746 Nov. 21, 2008, 9 pages.
Smetters D K et al.: "Instant Matchmaking: Simple and Secure Integrated Ubiquitous Computing Environments", Sep. 21, 2006, UBICOMP 2006: Ubiquitous Computing Lecture Notes in Computer Science; LNCS, Spring, Berlin, DE pp. 477-494.
Supplementary European Search Report, European Patent Office, Munich, Aug. 13, 2013, all pages.

* cited by examiner

*Primary Examiner* — Alexander Lagor
(74) *Attorney, Agent, or Firm* — Fenwick & West LLP

(57) ABSTRACT

A method, system and device for providing secure access to multimedia content received by a networked digital storage device, such as a set-top box. A mobile device, such as a mobile telephone, obtains appropriate security binding information and application software when coupled to the networked digital storage device at its end user location. The mobile device uploads the security binding information to a randomly located temporary hosting device at its place-shifted location when coupled thereto and, through a logical binding with the temporary hosting device, enables a secure, remote session. The secure binding and transfer of appropriate keys allow the remote hosting device to securely access premium or protected digital material/services available at the networked digital storage device. After completion of the secure, remote access session, termination occurs and the security binding information and the computing activity residue can be removed from the mobile device and the temporary hosting device.

13 Claims, 2 Drawing Sheets

METHOD, SYSTEM AND DEVICE FOR SECURED ACCESS TO PROTECTED DIGITAL MATERIAL

BACKGROUND OF THE INVENTION

1. Field of the Invention

The invention relates to the secure access of protected or privileged, private network digital material from a remote location. More particularly, the invention relates to remotely accessing protected digital material using a remotely-networked processing device and applications uploaded thereto from a portable personal communication device.

2. Description of the Related Art

Multimedia content processing devices, such as video converter/decoder (set-top box) devices and other digital video recorder (DVR) devices, can be configured to perform place shifting, which allows end users to watch multimedia programming content televised or received in one location from another location. For example, an end user can access multimedia content received by or stored on a first, multimedia content processing device in a first (end user) location, via a place-shifting device located at a second (place-shifted) location. That is, an end user having a set-top box or other multimedia content processing device at home (the end user location) can access multimedia content received by and/or stored on the set-top box by a computer or other temporary hosting device at a remote location (the place-shifted location) via an appropriate network connection, such as the Internet. Alternatively, an external place-shifting device can be connected to a conventional multimedia content processing device and to a broadband network to allow an end user to watch current multimedia content (e.g., live television broadcasts) or multimedia content stored in the multimedia content device from any location that has a connection to the broadband network.

However, conventional multimedia content processing devices that provide place-shifting features, as well as place-shifting device used to access place-shifted multimedia content, typically do not provide sufficient security to protect premium multimedia content from unauthorized access. Moreover, conventional multimedia content processing devices that provide place-shifting features typically do not allow secured access to premium multimedia content from remote or place-shifted locations.

DETAILED DESCRIPTION

Figure 1:
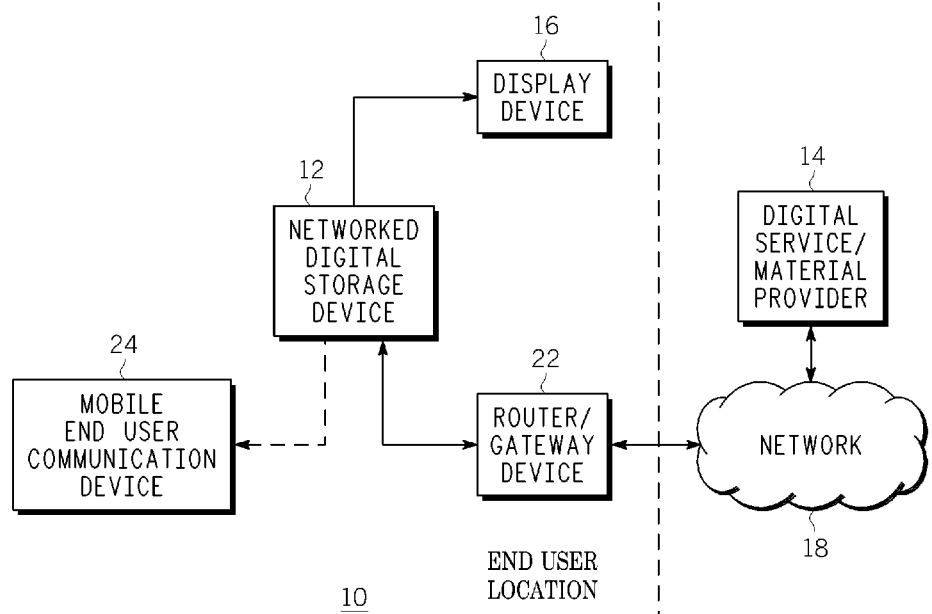
FIG. 1 is a block diagram of a system for providing secured access to protected digital material, showing the secure synchronization of a portable communications device at the end user's private network location.

In the following description, like reference numerals indicate like components to enhance the understanding of the methods and systems for securely accessing protected digital material through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The methods, systems and devices described herein involve providing secure and remote access to protected digital material locally available on a network attachment device (e.g., a personal computer, set-top box or other suitable device) using a remotely-networked processing device. Using an end user communication device, such as a mobile telephone device, appropriate security binding can be created and application software can be stored on the mobile end user communication device at the end user location. The mobile end user communication device then can be transported to a random location and the application software can be uploaded from the mobile end user communication device to a temporary hosting device at the remote location. Using the security binding information and application software, a secure place-shifting session can be established on the temporary hosting device while bound to the portable communications device, with the security binding providing the necessary and sufficient enabling of the secure session. The secure place-shifting session permits the user to remotely access premium or otherwise privileged, secure digital material from his or her "home" personal or private network. After completion of the secure place-shifting session, the session is terminated and the security information and/or application software can be deleted from the temporary hosting device as a feature of session tear-down. Notably, the loss of the binding between the mobile end user communication device and the temporary host is intended to also result in the termination of the place-shifting session.

In addition, the methods and systems described herein exploit a remotely-networked processing device as a temporary host for applications mounted through the use of software application uploaded from a portable personal communication device. The portable communication device also is charged with authentication privileges (e.g., "keys"), and bound by a user PIN (personal identification number) to authenticate the end user while attached to a privileged "home" network and before transport to a remote location. Also, the portable communication device is leveraged to transport those software applications (including appropriate data sinks and media rendering objects) not natively executed on the portable device itself, such that the eventual host may be appropriately configured by, bound to, and managed from the portable device through application uploading and associated user interfacing. In this manner, the methods and devices described herein provide a far-end, secure data tunnel terminus and anticipate the capability of the privileged "home" network to support establishment of the near-end secure data terminus in support of the described place-shifting behavior.

Referring to FIG. 1, shown is a block diagram of a portion of a system for providing security binding between a mobile end user device and a networked digital storage device. The portion of the system shown in FIG. 1 includes an end user location 10, which can be the home or business of the end user of the system. The end user location 10 of the system includes a networked digital storage device 12 configured to receive multimedia content/digital material/digital services from a digital service/material provider 14, and a multimedia content display device 16 coupled to the networked digital storage device 12. The networked digital storage device 12 can be connected to the digital service/material provider 14 via a network 18, such as an Internet protocol (IP) network. A router/gateway device 22 can be used, e.g., at the end user location 10, for connecting the networked digital storage device 12 to the network 18.

The digital service/material provider 14 can be any suitable transmission source of multimedia content, such as over-the-air broadcasters, from a cable television plant, satellite service provider or other digital material or service provider. The digital material can be any suitable multimedia content or other digital information, including movies, programming events, music, photos and/or medical records and financial information. The multimedia content typically is a plurality of digital signals formatted according to a suitable standard, such as the MPEG (Moving Picture Experts Group) 2 or MPEG 4 standard, and multiplexed into a data stream that is modulated on a carrier using quadrature amplitude modulation (QAM) or other suitable modulation technique. Some of the multimedia content, such as medical records and/or financial information, can be encrypted, e.g., in a suitable digital format.

The digital service/material provider 14 is connected to the networked digital storage device 12 via any suitable broadband connection, e.g., one or more coaxial cables and/or optical fibers, including a Hybrid Fiber Coaxial (HFC) cable system. Other suitable connections include suitable Fiber To The Premises (FTTP) systems, such as Fiber To The Curb (FTTC) or Fiber To The Home (FTTH), or over any suitable number of digital subscriber line systems (xDSL). Also, the multimedia content can be provided wirelessly, e.g., via over-the-air-broadcast from a satellite service provider or other suitable content service provider. The networked digital storage device 12 can be configured to receive digital material via a computer network, either through a wired connection or wirelessly. Alternatively, the networked digital storage device 12 can be configured to receive digital material wirelessly, via a wireless network.

The networked digital storage device 12 can be partially or completely any suitable device or subsystem (or portion thereof) for receiving digital material from the digital service/material provider 14, storing the received digital material, processing or decoding the received digital material, and transmitting or transferring the processed digital material to the end user display device 16, such as a television, a computer monitor or other suitable display device. Although the display device 16 is shown as a separate component from the networked digital storage device 12, the display device 16 and the networked digital storage device 12 can be combined or integrated as a single component.

For example, the networked digital storage device 12 can be any digital video recorder (DVR) or digital video server (DVS) device, including any signal converter or decoder box with internal and/or external recording capabilities and local and/or remote storage, which often are referred to as personal video recorder (PVR) devices. Other suitable networked digital storage devices include a residential gateway, a home media server system, a digital video disk recorder, a computer, a networked-attached storage device, a television with built-in or added-on multimedia content receiving and/or storing capability, and/or other suitable computing devices or multimedia content devices, including internet protocol (IP), satellite and cable digital video recorders, and home area network (HAN) devices and systems.

The router/gateway device 22 can be any suitable device for routing digital material between the networked digital storage device 12 and the network 18. The router/gateway device 22 can be part of a residential gateway or a home media server system that includes the networked digital storage device 12. Alternatively, all or a portion of the router/gateway device 22 and/or its functionality can be incorporated into or contained within the networked digital storage device 12.

The network 18 can be any communication network or network server arrangement suitable for connecting to the digital service/material provider 14 and to the networked digital storage device 12, either directly or indirectly, e.g., via the router/gateway device 22. For example, the network 18 can be the Internet or an Internet protocol (IP) based network, a computer network, a web-based network or other suitable wired or wireless network system. Also, at least a portion of the network 18 can be any wired or wireless wide area network (WAN), local area network (LAN) or wireless local area network (WLAN), such as a residential network.

As will be discussed in greater detail hereinbelow, the system for providing secured access to protected digital material also includes a mobile end user communication device 24. The mobile end user communication device 24 can be any suitable portable or mobile end user communication device that is configured to receive (download) information from the networked digital storage device 12 and transmit (upload) such information to other end user communication devices, such as randomly located temporary hosting devices, as will be discussed in greater detail hereinbelow. For example, the mobile end user communication device 24 can be a mobile or cellular telephone, a smartphone, a personal digital assistant (PDA) device or other wireless handheld device with such capability, a digital camera with such capability, a laptop personal computer (PC) or a notebook PC.

To download or create security binding information from the networked digital storage device 12, the mobile end user communication device 24 can be coupled to the networked digital storage device 12 in any suitable manner, e.g., using a universal serial bus (USB) cable connection or other wired suitable connection. Alternatively, the mobile end user communication device 24 can be configured to wirelessly receive (download) information from the networked digital storage device 12 and, as will be discussed in greater detail hereinbelow, wirelessly transmit (upload) such information to other end user communication devices, such as the temporary hosting devices.

Figure 2:
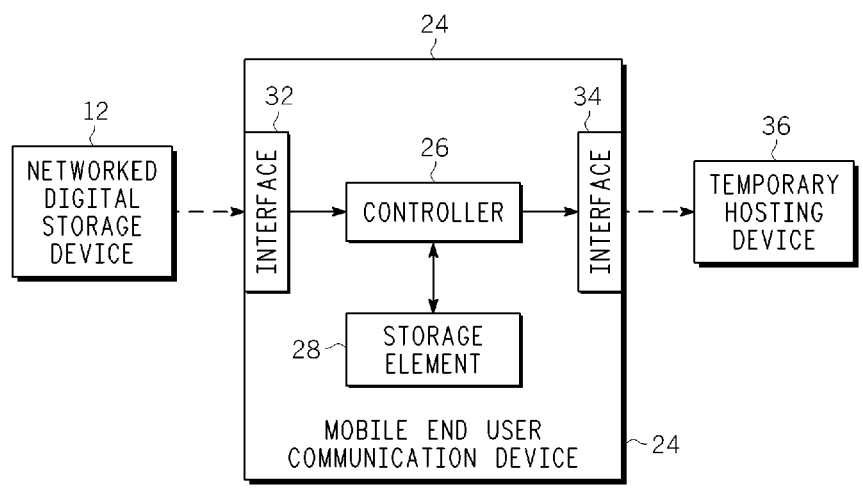
FIG. 2 is a block diagram of a mobile end user communication device for use in a system for providing secured access to protected digital material.

Referring now to FIG. 2, with continuing reference to FIG. 1, shown is a block diagram of the mobile end user communication device 24. The mobile end user communication device 24 includes a controller or processor 26 that, in general, processes digital information and other information received by the mobile end user communication device 24. The mobile end user communication device 24 also can include an optional content storage element 28 coupled to the controller 24. In addition to the content storage element 28, the mobile end user communication device 24 can include at least one type of memory or memory unit (not shown) within the controller 26 and/or a storage unit or data storage unit coupled to the controller for storing processing instructions and/or information received and/or created by the mobile end user communication device 24.

The mobile end user communication device 24 also can include one or more communication interfaces 32, 34 for receiving digital material and other information from end user communication devices, such as the networked digital storage device 12, and transmitting digital signal and other information to end user communication devices, such as a temporary hosting device 36, as will be discussed in greater detail hereinbelow. For example, the controller 26 and other components in the mobile end user communication device 24 can be coupled between a first interface 32, which can receive security information and other information, e.g., from the networked digital storage device 12, and a second interface 34, which can facilitate security information handshaking between the randomly located temporary hosting device 36 and the networked digital storage device 12. It should be understood that one or more of the interfaces 32, 34 can be a single communication interface coupled to the controller 26. Also, it should be understood that one or more of the interfaces 32, 34 can be an interface configured to support more than one networked digital storage device 12 and/or more than one temporary hosting device 36.

One or more of the controller 26, the storage element 28 and the interfaces 32, 34 can be comprised partially or completely of any suitable structure or arrangement, e.g., one or more integrated circuits. Also, it should be understood that the mobile end user communication device 24 includes other components, hardware and software (not shown) that are used for the operation of other features and functions of the mobile end user communication device 24 not specifically described herein. Also, the mobile end user communication device 24 can be partially or completely configured in the form of hardware circuitry and/or other hardware components within a larger device or group of components.

Figure 3:
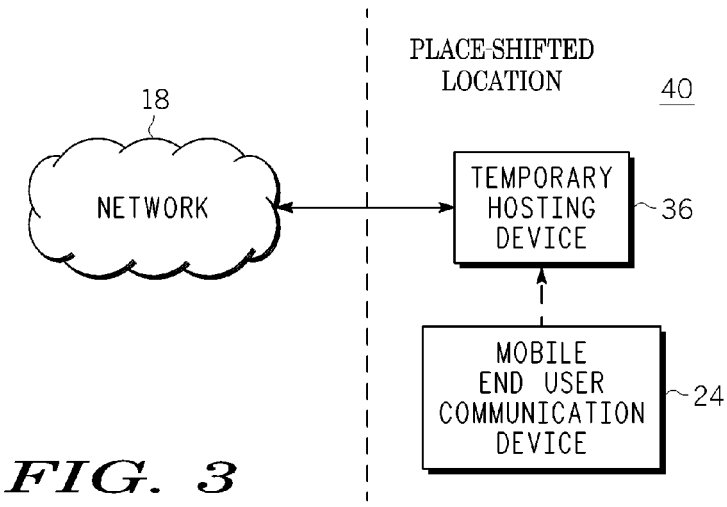
FIG. 3 is a block diagram of a system for providing secured access to protected digital material, showing the remote location.

Referring now to FIG. 3, with continuing reference to FIG. 1 and FIG. 2, shown is a block diagram of a portion of a system for providing secured access to protected digital material. The portion of the system shown in FIG. 3 includes a place-shifted location 40, which can be any random location that can be coupled to the network 18, e.g., for an IP network, any location that has access to the Internet or to an Internet connection.

The random place-shifted location 40 of the system includes a temporary hosting device 36. The temporary hosting device 36 can be any device suitable for place shifting multimedia content or receiving protected digital material, e.g., from the networked digital storage device 12, and for receiving and processing application(s) from the mobile end user communication device 24. As discussed hereinabove, place shifting allows digital service/material received by a first device in a first, end user location to be accessed by a second, randomly located place-shifted device in a second, place-shifted location. Place shifting can involve forwarding multimedia content from a receiving device, such as the networked digital storage device 12, to another device, such as the randomly located temporary hosting device 36, via an Internet connection or other suitable network connection, such as the network 18, with the appropriate security binding. That is, place shifting also allows digital material stored in a first communication device, such as the networked digital storage device 12, at a first location, such as the end user location 10, to be accessed by a second communication device, such as the temporary hosting device 36, in a second location, such as the place-shifted location 40.

For example, the temporary hosting device 36 can be any signal converter or decoder box or processor unit, including any DVR, DVS and/or any residential gateway or home media server system. Also, the temporary hosting device 36 can be any desktop computer, television or display device with built-in or added-on application processing capability, or other suitable computing devices or video devices, including internet protocol (IP), satellite and cable digital video recorders, and home area network (HAN) devices and systems. Also, the temporary hosting device 36 can be any suitable mobile communication device, such as a mobile or cellular telephone, a smartphone, a PDA or other wireless handheld device with such capability, a digital camera with such capability, a laptop personal computer (PC) or a notebook PC. The temporary hosting device 36 also can be in the form of a wired or wireless network and/or devices incorporated into or coupled to the network, e.g., via a wired connection or wirelessly.

Figure 4:
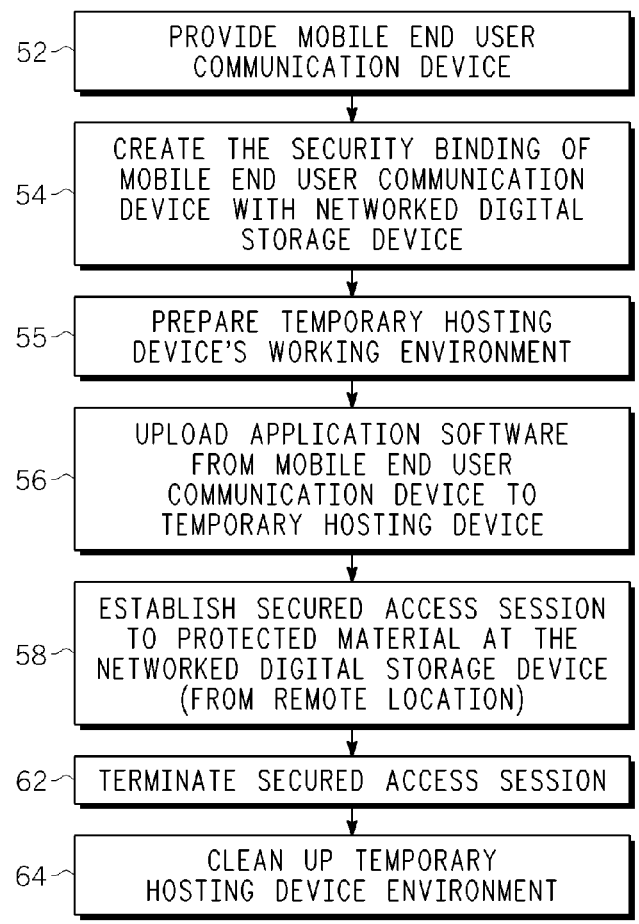
FIG. 4 is a block diagram of a method for providing secured access to protected digital material.

Referring now to FIG. 4, shown is a block diagram of a method 50 for providing secured access to protected digital material. As discussed hereinabove, conventional systems, methods and devices that allow place shifting do not provide sufficient security measures to protect premium multimedia content and confidential digital material received by and/or stored on an end user's networked digital storage devices from unauthorized access. Also, conventional place-shifting methods and systems do not provide for place-shifted access from a random location. However, the method 50 in FIG. 4 provides secure and place-shifted access of multimedia content received by and/or stored on a networked digital storage device at an end user location by a randomly located temporary hosting device at a random place-shifted location. Secure access can be made available through the use of a mobile end user communication device that can carry appropriate security binding information and applications from the networked digital storage device at the end user location to the randomly located temporary hosting device at the place-shifted location.

The method 50 includes a step 52 of providing a mobile end user communication device. As discussed hereinabove, the mobile end user communication device 24 can be any suitable portable or mobile device that can download or receive security binding information and security applications from the networked digital storage device 12 and facilitate or provide such information to the temporary hosting device 36 when coupled thereto. For example, the mobile end user communication device 24 can be a mobile telephone, a smartphone, a PDA or other suitable portable or mobile end user communication device.

The method 50 also includes a step 54 of creating appropriate security binding information and downloading application software from the networked digital storage device 12 to the mobile end user communication device 24. At the end user location, where the networked digital storage device 12 resides, the mobile end user communication device 24 can be physically connected or otherwise coupled to the networked digital storage device 12 in a manner that allows the creation of unique security binding information and the downloading of application software from the networked digital storage device 12 to the mobile end user communication device 24.

For example, the mobile end user communication device 24 can be coupled to the networked digital storage device 12 using a universal serial bus (USB) cable connection or other suitable wired connection between an appropriate interface of the networked digital storage device 12 and an appropriate interface of the mobile end user communication device 24. Alternatively, the mobile end user communication device 24 can be configured to wirelessly receive or download security binding information and application software from the networked digital storage device 12. For mobile telephone end user communication devices, the downloaded information can be stored in any suitable location therein, e.g., in the mobile telephone's memory card.

The unique security binding information created from pairing the networked digital storage device 12 to the mobile end user communication device 24 can allow any random temporary hosting device to access protected digital material received by or stored on the networked digital storage device 12. For example, the security information can include one or more private keys, which can be used to acquire individual session keys, e.g., from the networked digital storage device 12. The security information also can include other security keys that can decode or decrypt multimedia content that has been encoded or encrypted, e.g., by the digital service/material provider 14 and/or by the networked digital storage device 12. The security information also can include appropriate end user PIN number information, which can be used for a number of security purposes, including triggering a time limit for using the security and session keys. The security information also can include end user network identification information that can be used to properly identify an authorized end user or place-shifting communication device.

Also, the information downloaded from the networked digital storage device 12 to the mobile end user communication device 24 can include one or more application software modules or bundles, e.g., multimedia content access or session management application software. Such application software can be transferred from the networked digital storage device 12 to the mobile end user communication device 24. Also, as will be discussed in greater detail hereinbelow, the downloaded information can include utility software that can properly remove information related to the secured access session, such as browsing history information and cookies, and application software from the mobile end user communication device 24 and/or the temporary hosting device 36, e.g., upon the completion or termination of the secured access session.

The method 50 also includes a step 55 of preparing the working or operating environment of the temporary hosting device 36 before any activities. Because the temporary hosting device 36 is in a random location, the temporary hosting device 36 is not always subject to protection against viruses and malicious software infection. Therefore, a clean up of the operating environment is automatically invoked by the utility software in the mobile end user communication device 24 whenever the mobile end user communication device 24 is coupled to the temporary hosting device 36.

The method 50 also includes a step 56 of the mobile end user communication device 24 uploading the application software from the mobile end user communication device 24 to the temporary hosting device 36. Once the mobile end user communication device 24 has downloaded the application software from the networked digital storage device 12 at the end user location, the mobile end user communication device 24 can be transported to any random location of the temporary hosting device 36, i.e., the place-shifted location. At the place-shifted location, which typically is a location remote from the end user location, the mobile end user communication device 24 can be physically connected or otherwise coupled to the temporary hosting device 36 in a manner that allows the appropriate transfer of the application software from the mobile end user communication device 24 to the temporary hosting device 36.

For example, the mobile end user communication device 24 can be coupled to the temporary hosting device 36 using a universal serial bus (USB) cable connection or other suitable wired connection between the communication interface 34 of the mobile end user communication device 24 and an appropriate interface of the temporary hosting device 36. Alternatively, the mobile end user communication device 24 can be configured to wirelessly transmit or upload security information to the temporary hosting device 36.

The uploading step 56 includes transferring any amount of application software from the mobile end user communication device 24 to the temporary hosting device 36 to allow a secured place-shifting session to occur between the temporary hosting device 36 and the networked digital storage device 12. That is, the mobile end user communication device 24 uploads appropriate application software to the temporary hosting device 36 to allow the temporary hosting device 36 to establish secured access to the protected digital material or services received by and/or stored on the networked digital storage device 12, e.g., as part of a place-shifting session between the temporary hosting device 36 and the networked digital storage device 12.

For example, the uploading step 56 can transfer appropriate security keys to the place-shifted communication device 36, which, in turn, allows the place-shifted communication device 36 to acquire from the multimedia content processing device 12 the appropriate session keys for a place-shifting session between the place-shifted communication device 36 and the multimedia content processing device 12. Also, the uploading step 56 can transfer appropriate PIN number information that allows an end user using the place-shifted communication device 36 to unlock access to one or more stored and/or acquired security and/or session keys, which allow for secured place-shifting sessions. Also, the uploading step 56 can transfer appropriate end user identification information from the mobile end user communication device 24 to the place-shifted communication device 36. Such information can allow an end user using the place-shifted communication device 36 to properly identify himself or herself to the network and/or to the multimedia content processing device 12 as an authorized end user.

As part of the uploading step 56, the mobile end user communication device 24 initially can transfer appropriate application software to the place-shifted communication device 36 that is not already loaded on the place-shifted communication device 36. Such application software can be used to set up or establish an appropriate place-shifting working environment on the place-shifted communication device 36 for a place-shifting session with the multimedia content processing device 12. If the place-shifted communication device 36 already has the appropriate application software loaded thereon, the uploading step 56 may be used to transfer any appropriate security information that allows the place-shifted communication device 36 to unlock existing application software or re-activate the place-shifting working environment.

The method also includes a step 58 of establishing a secure, place-shifting session between the temporary hosting device 36, which is located at a remote or random place-shifted location, and the networked digital storage device 12, which is located at an end user location, such as the home of the end user. Once the temporary hosting device 36 has received the appropriate application software and been granted the security information, the temporary hosting device 36 can initiate a secure, place-shifting multimedia content session with the networked digital storage device 12. In this manner, the temporary hosting device 36 will be able to remotely and securely access protected digital material/services received by and/or stored on the networked digital storage device 12, i.e., secured multimedia content or other digital content/services that is protected from unauthorized access.

For example, the establishing step 58 can facilitate the appropriate security keys to the temporary hosting device 36, which, in turn, allows the temporary hosting device 36 to acquire from the networked digital storage device 12 the specific session keys for a place-shifting session between the temporary hosting device 36 and the networked digital storage device 12. Also, the establishing step 58 can facilitate appropriate PIN number information that allows an end user using the temporary hosting device 36 to unlock or otherwise access one or more stored and/or acquired security and/or session keys, which allow for secured place-shifting sessions. Also, the establishing step 58 can provide the appropriate end user identification information from the mobile end user communication device 24. Such information can allow an end user using the temporary hosting device 36 to properly identify himself or herself to the network 18 and/or to the networked digital storage device 12 as an authorized end user.

For example, using an appropriate session management application, the temporary hosting device 36 can establish initial handshaking with the networked digital storage device 12. Once the handshaking is established, the end user could validate his or her presence at the temporary hosting device 36 by using one or more security keys from the mobile end user communication device 24 to acquire one or more place-shifting session keys from the networked digital storage device 12. Upon acquiring the place-shifting session keys from the networked digital storage device 12, the end user can use the session keys to establish a secure place-shifting session between the networked digital storage device 12 and the temporary hosting device 36, thus providing the end user at the temporary hosting device 36 the ability to access secure, protected digital material and/or services, i.e., secured multimedia content received by and/or stored on the networked digital storage device 12.

The protected digital material accessed by the end users at the temporary hosting device 36 can be real-time multimedia content streamed to the networked digital storage device 12, e.g., by the digital service/material provider 14. Alternatively, the protected digital material can be content previously provided to the networked digital storage device 12 and subsequently stored thereon, e.g., using any one or more of a number of suitable storing or recording devices contained within or coupled to the networked digital storage device 12. The navigation and access management of the premium multimedia content from the networked digital storage device 12 to the temporary hosting device 36 can be controlled or performed by the networked digital storage device 12 and/or the routing/gateway device 22 and/or other suitable components or devices within the system. Such access management also will depend on the nature of the particular security level granted to the temporary hosting device 36.

The method 50 also includes a step 62 of terminating the secured, place-shifting session established between the temporary hosting device 36 and the networked digital storage device 12. Upon completion of the place-shifting session, the session is terminated, e.g., automatically or manually, by the end user via one or more of the devices involved in establishing and/or managing the place-shifting session. For example, the session can be terminated automatically after a given amount of session access time has elapsed or in response to one or more session events. Also, the session can be terminated automatically if the end user is not properly identified by the networked digital storage device 12. Alternatively, the session can be terminated manually by the end user, e.g., via any suitable device involved in the place-shifting session. For example, the end user can have session termination initiated by the mobile end user communication device 24 and/or the temporary hosting device 36 and/or the router/gateway device 22 and/or other suitable devices involved in the place-shifting session.

The termination step 62 typically also includes session teardown, e.g., appropriate network disconnection between the networked digital storage device 12 and the temporary hosting device 36. As with other aspects of the session termination, session teardown can be at the request or command of the end user, via any suitable device involved in the place-shifting session, e.g., the networked digital storage device 12 and/or the temporary hosting device 36 and/or the router/gateway device 22, and/or other suitable devices involved in the place-shifting session.

The method 50 also can include a step 64 of removing security information and/or application software from the temporary hosting device 36 and/or the mobile end user communication device 24, e.g., automatically or manually. The step 64 includes removing, deleting and/or purging all or a portion of the place-shifting session information footprints or trails, such as browsing histories, created files and cookies, and other information. Once the place-shifting session has been completed and terminated, the security information and/or application software stored on the temporary hosting device 36 can be removed, e.g., by appropriate utility software. As discussed hereinabove, the appropriate removal utility software can be transferred from the mobile end user communication device 24 to the temporary hosting device 36 as part of the uploading step 56. The execution of the appropriate removal utility software typically will remove all or a portion of the security information and session application software from the temporary hosting device 36, e.g., as is needed to adequately protect the end user from identity theft and/or other malicious behavior. The removal step 64 can be performed or executed automatically as soon as the place-shifting session terminated.

It should be understood that alternatively, the temporary hosting device 36, if mobile could connect directly to a networked digital storage device for its digital material or service. Such may be the case when the bandwidth or processing power of the mobile end user communication device is not sufficient for certain applications, such as accessing a detailed x-ray picture and presenting the accessed x-ray picture on a larger display device instead of the small display of the mobile end user communication device.

Also, it should be understood that the methods, systems and devices described herein can be used to provide security information and/or application software for secure, portable access to content in other applications, e.g., using a randomly located temporary hosting device. For example, the methods, systems and devices described herein can be used to allow secure, portable access to personal financial information on a home or network computer system through a temporary hosting device. Also, the methods, systems and devices described herein can be used to allow secure, portable access to a home automation system or home security system via a temporary hosting device.

The method shown in FIG. 4 may be implemented in a general, multi-purpose or single purpose processor. Such a processor will execute instructions, either at the assembly, compiled or machine-level, to perform that process. Those instructions can be written by one of ordinary skill in the art following the description of FIG. 4 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, silicon memory (e.g., removable, non-removable, volatile or non-volatile), packetized or non-packetized wireline or wireless transmission signals.

It will be apparent to those skilled in the art that many changes and substitutions can be made to the methods and systems for securely accessing protected digital material herein described without departing from the spirit and scope of the invention as defined by the appended claims and their full scope of equivalents.

The invention claimed is:

1. A method for providing secured access to digital material received by a first end user communication device in an end user location to a temporary hosting device, the method comprising:

obtaining, by a mobile end user communication device from a first end user communication device at a first time, security binding information that allows secured access to at least a portion of digital material received by the first end user communication device, the security binding information comprising a security key and a PIN number, the security binding information created based on pairing the first end user communication device to the mobile end user communication device, the mobile end user communication device and the first end user communication device at a first location at the first time; and providing, by the mobile end user communication device to a temporary hosting device at a second time, application software and the security binding information obtained by the mobile end user communication device from the first end user communication device, the mobile end user communication device and the temporary hosting device at a second location at the second time and the first end user communication device at the first location at the second time, the second location remote from the first location;

wherein the PIN number included in the security binding information allows a user of the temporary hosting device to unlock access to the security key included in the security binding information in response to the user providing to the temporary hosting device PIN information that matches the PIN number;

wherein the security key included in the security binding information allows the temporary hosting device to be validated by the first end user communication device and for the temporary hosting device to receive a place-shifting key from the first end user communication device in response to being validated;

wherein the place-shifting key allows the temporary hosting device to establish an encrypted place-shifting session with the first end user communication device to access at the second location the portion of the digital material from the first end user communication device; and wherein the application software is configured to scan the temporary hosting device for malware prior to the temporary hosting device accessing the portion of the digital material and to remove the security binding information from the temporary hosting device after the temporary hosting device accesses the portion of the digital material.

2. The method as recited in claim 1, further comprising terminating accessing the portion of the digital material.

3. The method as recited in claim 2, wherein the terminating is initiated from at least one of the first end user communication device, the mobile end user communication device and the temporary hosting device.

4. The method as recited in claim 1, wherein the security binding information further includes at least one of one or more private keys, one or more decoding keys, session management application software, end user personal network identification information, and session termination utility software.

5. A mobile end user device for allowing secured access to multimedia content, the mobile end user device comprising:

a controller configured to:

receive from a first end user communication device at a first time, security information that allows secured access to multimedia content received by the first end user communication device, the security binding information comprising a security key and a PIN number, the security binding information created based on pairing the first end user communication device to the mobile end user communication device, the mobile end user communication device and the first end user communication device at a first location at the first time; and provide to a temporary hosting device at a second time, application software and the security information received from the first end user communication device, the mobile end user communication device and the temporary hosting device at a second location at the second time and the first end user communication device at the first location at the second time, the second location remote from the first location; and a memory element coupled to the controller for storing the security information received from the first end user communication device, wherein the PIN number included in the security binding information allows a user of the temporary hosting device to unlock access to the security key included in the security binding information in response to the user providing to the temporary hosting device PIN information that matches the PIN number;

wherein the security key included in the security binding information allows the temporary hosting device to be validated by the first end user communication device and for the temporary hosting device to receive a place-shifting key from the first end user communication device in response to being validated;

wherein the place-shifting key allows the temporary hosting device to establish an encrypted place-shifting session with the first end user communication device to access at the second location the multimedia content from the first end user communication device; and wherein the application software is configured to scan the temporary hosting device for malware prior to the temporary hosting device accessing the multimedia content and to remove the security binding information from the temporary hosting device after the temporary hosting device accesses the multimedia content.

6. The device as recited in claim 5, wherein the security information further includes at least of decoding key, session management application software, end user personal network identification information, and session termination utility software.

7. The device as recited in claim 5, wherein the first end user communication device is selected from the group consisting of a signal converter box, a signal decoder box, a digital video recorder, a digital video disk recorder, a personal video recorder device, a home media server, a digital video server, a residential gateway, a video receiver, a computer, a cellular telephone, a smart telephone, a personal digital assistant (PDA), a digital music player, a portable video player, a wireless handheld device, a digital camera, a mobile communication device, a laptop personal computer (PC), a notebook PC and a mobile computing device.

8. A system for securely accessing multimedia content, the system comprising:

a first end user communication device configured to:

receive multimedia content; and provide security information to a mobile end user communication device at a first time, the security information allows secured access to the multimedia content received by the first end user communication device, the security binding information comprising a security key and a PIN number, the security binding information created based on pairing the first end user communication device to the mobile end user communication device;

a mobile end user communication device configured to:
obtain the security information from the first end user communication device at the first time, the mobile end user communication device and the first end user communication device at a first location at the first time; and providing to a temporary hosting device at a second time, application software and the security information obtained from the first end user communication device, the mobile end user communication device and the temporary hosting device at a second location at the second time and the first end user communication device at the first location at the second time, the second location remote from the first location; and the temporary hosting device configured to:
unlock access to the security key included in the security binding information in response to a user providing PIN information to the temporary hosting device that matches the PIN number included in the security binding information,;

transmit the security key included in the security binding information to the first end user communication device in response to unlocking access to the security key,;

receive a place-shifting key from the first end user communication device in response to the first end user communication device validating the temporary hosting device based on the transmitted security key; and establish an encrypted place-shifting session with the first end user communication device to securely access at the second location the multimedia content from the first end user communication device, wherein the application software is configured to scan the temporary hosting device for malware prior to the temporary hosting device accessing the multimedia content and to remove the security information from the temporary hosting device after the temporary hosting device accesses the multimedia content.

9. The system as recited in claim 8, wherein the security information further includes at least one of one or more decoding keys, session management application software, end user personal network identification information, and session termination utility software.

10. The system as recited in claim 8, wherein at least a portion of the multimedia content received by the first end user communication device and available for secured access is stored on the first end user communication device.

11. The system as recited in claim 8, wherein at least one of the first end user communication device and the temporary hosting device is selected from the group consisting of a signal converter box, a signal decoder box, a digital video recorder, a digital video disk recorder, a personal video recorder device, a home media server, a digital video server, a residential gateway, a video receiver and a desktop computing device.

12. The system as recited in claim 8, wherein the mobile end user communication device is selected from the group consisting of a cellular telephone, a smart telephone, a personal digital assistant (PDA), a digital music player, a portable video player, a wireless handheld device, a digital camera, a mobile communication device, a laptop personal computer (PC), a notebook PC and a mobile computing device.

13. A method for obtaining secured access to digital material received by a first end user communication device in an end user location, the method comprising:

obtaining, by a temporary hosting device from a mobile end user communication device at a first time, security binding information that allows secured access to at least a portion of digital material received by a first end user communication device, the security binding information comprising a security key and a PIN number, the security binding information provided by the first end user communication device to the mobile end user communication device at a second time prior to the first time, the security binding information created based on pairing the first end user communication device to the mobile end user communication device, the mobile end user communication device and the temporary hosting device at a first location at the first time, the mobile end user communication device and the first end user communication device at a second location at the second time, the first location remote from the second location;

responsive to a user providing PIN information to the temporary hosting device that matches the PIN number included in the security binding information, unlocking, by the temporary hosting device, access to the security key included in the security binding information;

responsive to unlocking access to the security key, transmitting, by the temporary hosting device to the first end user communication device, the security key;

responsive to the first end user communication device validating the temporary hosting device based on the security key, receiving, by the temporary hosting device from the first end user communication device, a place-shifting key;

establishing, by the temporary hosting device, an encrypted place-shifting session with the first end user communication device based on the place-shifting key; and accessing, by the temporary hosting device, the portion of the digital material from the first end user communication device through the place-shifting session.

* * * * *